United States Patent [19]

Nebelung et al.

[11] Patent Number: 4,944,207
[45] Date of Patent: Jul. 31, 1990

[54] SINGLE SHEAR BLADE MECHANISM FOR GOB SEVERING

[75] Inventors: Hermann H. Nebelung, Winsen/Luhe; Walter Ruschau, Monheim, both of Fed. Rep. of Germany

[73] Assignee: Emhart Industries, Inc., Towson, Md.

[21] Appl. No.: 421,416

[22] Filed: Oct. 13, 1989

[30] Foreign Application Priority Data

Oct. 18, 1988 [GB] United Kingdom ............... 8824401

[51] Int. Cl.$^5$ ............................................. C03B 7/12
[52] U.S. Cl. ......................................... 83/162; 83/169;
   83/170; 83/171; 83/578; 83/618; 65/334
[58] Field of Search ............... 83/623, 162, 578, 171,
   83/170, 169, 630, 618; 65/332, 334

[56] References Cited

U.S. PATENT DOCUMENTS

| | | | |
|---|---|---|---|
| 3,996,037 | 12/1976 | Wythe | 65/334 |
| 4,214,494 | 7/1980 | Dahms | 83/150 |
| 4,329,896 | 5/1982 | Singer | 83/210 |
| 4,619,169 | 10/1986 | King | 83/697 |

FOREIGN PATENT DOCUMENTS

| | | | |
|---|---|---|---|
| 0121816 | 6/1986 | Japan | 83/169 |
| 1349361 | 4/1974 | United Kingdom | 83/578 |

Primary Examiner—Frank T. Yost
Assistant Examiner—John M. Husar
Attorney, Agent, or Firm—Spencer T. Smith

[57] ABSTRACT

A gob severing mechanism comprises a single blade which severs a series of gobs by passing rapidly through columns of glass, severing a first series on movement in one direction and a second series on movement in the other direction. In rest positions on opposite sides of the glass columns wherein the blade is positioned in shrouds in which it is cooled by a mist of coolant, e.g. water.

2 Claims, 1 Drawing Sheet

SINGLE SHEAR BLADE MECHANISM FOR GOB SEVERING

BACKGROUND OF THE INVENTION

This invention is concerned with a severing mechanism operable to sever gobs from a column of molten glass issuing from a feeder.

In the manufacture of glass containers, molten glass is produced in a furnace and flows from the furnace along a forehearth where it is brought to the desired temperature. At one end of the forehearth a feeder is provided which controls the flow of molten glass out of the forehearth in one or more columns The columns of glass are severed by a severing mechanism into individual gobs of molten glass, each gob containing sufficient glass to make one container, and the severed gobs are fed under gravity to a moulding machine. If the machine is arranged to make one container at a time, one column of glass is provided and one gob at a time is separated, but the machine may be arranged to make two, three or even four containers at a time, in which case there will be a corresponding number of columns and a corresponding number of gobs separated at one time.

Commonly the severing mechanism comprises two opposed blades for each column which are moved simultaneously towards the column from opposite sides thereof into an overlapping condition to shear against each other and thus to separate a gob from the column Frequently, the blades are moved arcuately, but in general because the blades are brought into overlapping rest positions in the column to shear it, the blades are moved comparatively slowly in the glass and are thus less efficient in their severing action than a fast moving blade.

In U.S. Pat. specification No. 3 996 037 there is described a shearing mechanism operable to shear gobs from a column of molten glass which comprises two blades each having a first cutting edge along one side of the blade and a second cutting edge along the other side of the blade and means for moving the blades simultaneously in opposite directions along linear paths each from opposite sides of the column to the other thus to separate a gob by the shearing action of the two blades passing through the column. This shearing mechanism requires not only two blades but also mechanism for moving the blades simultaneously in opposite directions and mechanism for adjusting the vertical distance between the blades.

It is one of the objects of the present invention to provide a particularly simple construction of severing mechanism operable to sever gobs from a column of glass.

BRIEF SUMMARY OF THE INVENTION

The present invention provides a severing mechanism operable to sever gobs from a column of molten glass issuing from a feeder which mechanism comprises, a blade having a first cutting edge along one side of the blade and a second cutting edge along the other side of the blade, means for moving the blade back and forth along a linear path transversely to the column of glass, the first edge leading when the blade moves from a first rest position on one side of the column to a second rest position on the other side to sever a gob and the second edge leading when the blade moves from the second rest position to the first rest position to sever another gob, the blade operating to sever each gob by rapid passage of the blade through the column without a shearing action against a further blade.

A particular problem in the operation of mechanisms for severing gobs of glass from columns of molten glass is the blades of the mechanisms absorb heat from the glass and therefore have to be cooled. This is normally carried out by spraying the blades with water, but at times this water either misses the blades or drips from them, and may get onto parts of the severing mechanism or of other machinery in the glass container production line, thus to cause changes to the homogeneity of the glass or damage to the machinery resulting in poor moulding of the container.

A severing mechanism according to the invention, preferably comprises first and second shrouds arranged to at least partially surround the blade and first and second spraying means arranged continuously to create a fine mist of coolant when it is in its first and second rest positions, in the shrouds. The mist serves to cool the blade while the shrouds retain any coolant which falls from the blade.

Consequently, each shroud is in the form of a chamber having a slit therein through which the blade moves into its first and second rest positions.

Preferably in a severing mechanism according to the invention the blade is mounted on a carriage which is slidable on two parallel horizontally extending rods, and the two rest positions are symmetrically disposed on opposite sides of the column of glass.

Preferably a severing mechanism according to the invention also comprises a first movable gob guide which moves into position close to the column of glass on the side of the columns opposite to the first position of the blade as the blade is moved from its first rest position to its second rest position to sever a gob, and a second movable gob guide which moves into position close to the column of glass on the side of the column opposite to the second rest position of the blade as the blade is moved from its second rest position to its first rest position to sever a gob. These gob guides serve to ensure that the gobs are accurately directed towards chutes along which they pass to the container moulding machines.

In a modified mode of operation both gob guides may be brought into position around the column of molten glass to provide a substantially closed funnel for the severed gob.

It will be understood that a mechanism according to the invention may be arranged to operate on more than one column of glass at a time, certain of its parts being duplicated to enable it to do so.

BRIEF DESCRIPTION OF THE DRAWINGS

There now follows a description of a severing mechanism to illustrate the invention by way of example.

In the accompanying drawings.

DETAILED DESCRIPTION OF PREFERRED EMBODIMENT OF THE INVENTION

Figure 1:
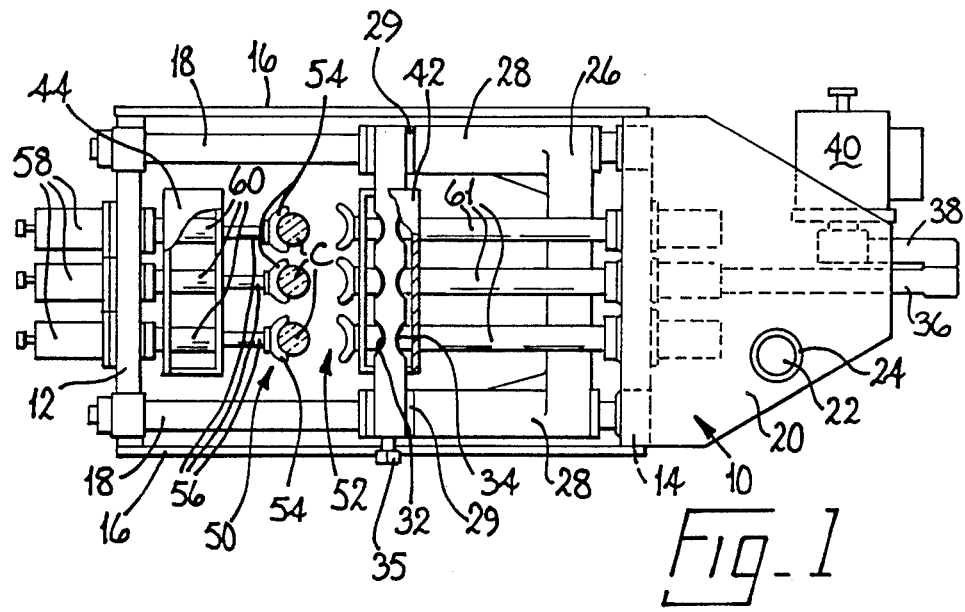
FIG. 1 shows a plan view of the illustrative severing mechanism.
Figure 2:
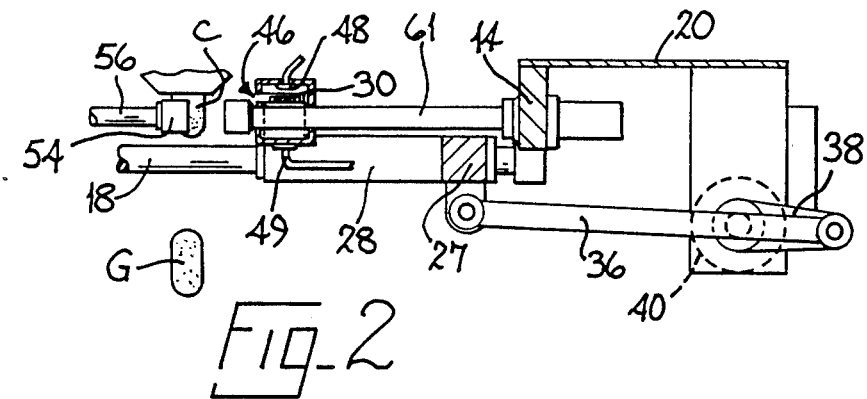
FIG. 2 shows a side view, partly in section, of the illustrative mechanism.

The illustrative severing mechanism is operable to sever gobs G from three columns C of molten glass issuing from a feeder and comprises a blade 30 having a first cutting edge 32 along one side of the blade and a second cutting edge 34 along the other side of the blade, the two cutting edges each being provided with scollops corresponding to the columns C of molten glass.

The mechanism comprises means for moving the blade 30 back and forth along a linear path transversely to the columns of glass. A supporting frame 10 of the mechanism comprises two parallel supporting blocks 12, 14 connected by side members 16. Extending between the blocks 12, 14 and fixed to them are two parallel horizontally extending tie rods 18.

Fixed to the block 14 is a supporting plate 20 provided with a vertical bearing 24 by which the frame 10 can be pivotally mounted for swinging movement in a horizontal plane about a column 22. Such swinging movement enables the severing mechanism to be moved between an operative position beneath a feeder and an inoperative position where maintenance can be performed.

Slidably mounted on the rods 18 is a carriage 26 comprising two sleeves 28, which slide on the rods 18, a cross bar 27 and two upwardly extending supports 29. The blade 30 is secured between the supports 29 transversely of the rods 18 by quick release devices (not shown). The blade 30 may be tensioned by a tensioning screw 35. A link 36 is pivoted to the cross bar 27 and to a crank 38 which is driven by a reversible motor 40 which is secured to the plate 20.

The motor 40 is servo controlled to operate intermittently to make one half revolution a time, thus, through the crank 38 and link 36, to move the blade 30 back and forth along a linear path transversely of the columns C of molten glass, the first edge 32 leading when the blade moves from a first rest position, as shown in FIG. 1, on one side of the columns to a second rest position on the outer side, and in such movement to sever three gobs, one from each of the columns C, and then to move back, the second edge 34 leading, from the second position to the first position to sever three more gobs. The blade 30 operates by itself to sever the gobs, not by a shearing action against a further blade, and this severing is assisted by the fact that the blade is at the fastest part of its path of movement between the two rest positions when it passes through the columns C. It will be seen that the two rest positions are symmetrically disposed on opposite sides of the columns C. To ensure that the speed of passage of the blade through the glass is rapid, it is thin, i.e. not more than 0.5 mm thick.

When the blade 30 is in its first or its second rest position it is positioned respectively in a shroud 42, 44. Each shroud is in the form of a rectangular chamber or box having a slit 46 along one face through which the blade 30 moves into its first and second rest positions. Each shroud 42, 44 is provided with a spray head 48 which permanently creates a mist of coolant in the shroud 42, 44. Any coolant which condenses on the walls of the shroud 42, 44 or falls from the blade 30 drains away through a drain 49 and may if desired be recycled. Thus, the blade 30 is cooled by the mist in the shroud, but the amount of liquid coolant on the blade is minimized and there is a greatly reduced likelihood of coolant contacting the molten glass or falling into other parts of the container moulding machine.

The illustrative mechanism also comprise two series of gob guides 50 and 52. The first series of gob guides 50 comprises three curved guide pieces 54 each mounted on a shaft 56 of a piston and cylinder arrangement 58, the three arrangements 58 being individually adjustably secured to the supporting block 12. The shafts 56 pass through sleeves 60 which extend between opposite side walls of the shroud 44, and outwardly to the supporting block 12, thus supporting the shroud 44 in position. The first gob guides 50 are moved into position as shown adjacent to the glass columns C just before the blade 30 begins its movement from its first rest position in the shroud 42, through the columns C into its second rest position in the shroud 44. The gob guide pieces 54 are brought into position adjacent to, but not touching, the glass columns C and may if desired provide a surface against which the blade 30 will cut as well as a guide for the cut gob to ensure that it is correctly positioned at the beginning of its downward path to the container forming machine; when the blade 30 has severed the gobs the guides 50 are moved back into a retracted position. The second series of gob guides 52 correspondingly comprise shafts which pass through sleeves 61 fixed in the shroud 42, and the gob guides 52 move into position close to the columns of glass C just before the blade 30 moves from its second rest position in the shroud 44 to sever a further series of gobs from the column C as it passes into its first rest position in the shroud 42. The sleeves 61 are secured to the block 14 and serve to support the shroud 42.

Figure 3:
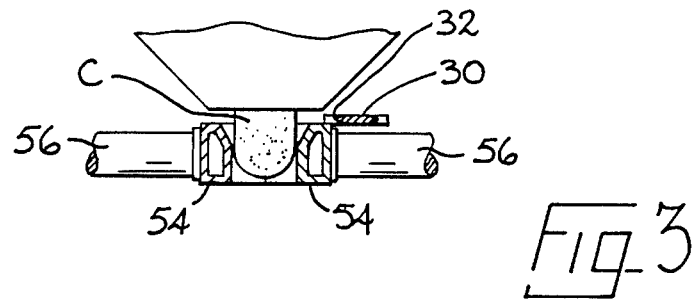
FIG. 3 shows parts of the mechanism in a modified mode of operation.

FIG. 3 shows an alternative mode of operation of a modified form of the illustrative mechanism. In this alternative mode the gob guide pieces 54 of both series of gob guides 50 and 52 are brought into position around the columns of molten glass C before the blade 30 passes through the column to sever it. In this way the direction of fall of the severed gob is more closely controlled as the guides provide a substantially closed funnel for the gobs to pass through.

In the illustrative mechanism the gob guide pieces 54 are cooled by coolant supplied through the shafts 56 of the piston and cylinder arrangements.

The illustrative mechanism can if desired be modified to obtain movement of the blade 30 by piston and cylinder devices, replacing the sleeves 28 and the rods 18, rather than by use of a reversible motor 40 and a crank mechanism as described above.

We claim:

1. A mechanism for shearing discrete gobs from a runner of molten glass, comprising:
   a shear blade having cutting edges on opposite sides thereof,
   means for displacing said shear blade form a first rest position through the runner to shear the runner with the cutting edge on one side of said shear blade and for displacing said shear blade from a second rest position through the runner to shear the runner with the other cutting edge,
   opposed gob guide means,
   means for displacing one of said gob guide mans from a retracted position toward said first rest position to a selected gob guide location before said shear blade is displaced from said first rest position to shear a gob,
   means for displacing the other one of said gob, guide means from a retracted position toward said second rest position to a selected gob guide location before said shear blade is displaced from said second rest position to shear a gob, shroud means for enclosing said shear blade when said shear blade is located at either said first or second rest positions, and means from introducing a mist of coolant into said shroud means to cool said shear blade, the mist condensing on the cooler shroud means to keep the shear blade free of coolant.

2. A mechanism for shearing descrete gobs according to claim 1, further comprising means for simultaneously displacing said pair of gob guide means.

* * * * *